United States Patent [19]

Fiasse et al.

[11] Patent Number: 5,204,305
[45] Date of Patent: Apr. 20, 1993

[54] COCATALYTIC COMPOSITION WHICH IS USABLE FOR THE POLYMERIZATION OF ALPHA-OLEFINS

[75] Inventors: Paul Fiasse, Brussels; Hervé Collette, Namur, both of Belgium

[73] Assignee: Solvay S.A., Brussels, Belgium

[21] Appl. No.: 751,936

[22] Filed: Aug. 30, 1991

[30] Foreign Application Priority Data

Aug. 30, 1990 [BE] Belgium ............................ 09000839

[51] Int. Cl.$^5$ .............................................. C08F 4/649
[52] U.S. Cl. .................................. 502/124; 502/112; 502/125; 502/127; 526/141; 526/142
[58] Field of Search ................. 502/124, 125, 127, 112

[56] References Cited

U.S. PATENT DOCUMENTS

| | | | |
|---|---|---|---|
| 3,100,218 | 8/1963 | May et al. ............................ | 502/103 |
| 3,412,174 | 11/1968 | Kroll ............................ | 502/117 X |
| 3,549,717 | 12/1970 | Itakura et al. ................... | 502/125 X |
| 4,183,824 | 1/1980 | Shiga et al. ........................ | 502/111 |
| 4,210,729 | 7/1980 | Hermans et al. ...................... | 525/247 |
| 4,210,736 | 7/1980 | Baekelmans et al. ................ | 526/142 |
| 4,210,738 | 7/1980 | Hermans et al. ...................... | 526/152 |
| 4,295,991 | 10/1981 | Wristers .............................. | 502/126 |
| 4,368,304 | 1/1983 | Sato et al. ............................ | 526/114 |
| 4,400,494 | 8/1983 | Arzoumanidis et al. ........ | 502/108 X |

FOREIGN PATENT DOCUMENTS

| | | |
|---|---|---|
| 120142 | 10/1966 | Czechoslovakia . |
| 0021753 | 1/1981 | European Pat. Off. . |
| 0069461 | 1/1983 | European Pat. Off. . |
| 0261727 | 3/1988 | European Pat. Off. . |
| 0334411 | 9/1989 | European Pat. Off. . |
| 2551759 | 3/1985 | France . |
| 681253 | 3/1973 | Japan . |
| 87/6968 | 3/1988 | South Africa . |
| 2061976 | 5/1981 | United Kingdom . |
| 2146341 | 4/1985 | United Kingdom . |

OTHER PUBLICATIONS

Database Chemical Abstracts (Host:STN), vol. 78, No. 6, Abrégé No. 30760a, Columbus, Ohio, US; & JP-A-47 031 703 (Showa) Aug. 15, 1972.
LU-A 45 585 (Scholven-Chemie).
"The Stereochemistry of Macromolecules", vol. 1, Edited by A. D. Ketley, 1967, pp. 24–27.
"Reactions of Organoaluminium Compounds With Electron Donors", S. Pasynkiewicz, pp. 509–521 Pure Appl. Chem. 30 (1972).
"Reaction Of Methyl Benzoate With Methylaluminium Compounds", K. B. Starowieyski et al. Journal of Organometallic Chemistry, 117(1976) C1–C3.

*Primary Examiner*—Patrick P. Garvin
*Attorney, Agent, or Firm*—Spencer, Frank & Schneider

[57] ABSTRACT

Cocatalytic composition resulting from bringing an organoaluminium halide (A) into contact with an electron-donating organic compound (ED) selected from esters, amides and ketones, the organoaluminium halide (A) possessing an atomic ratio halogen (X)/aluminium (Al) of greater than 1 and less than 1.3, the halide (A) and the compound (ED) being employed in a mole ratio halide (A)/compound (ED) of greater than 20.

Catalytic systems which are usable for the polymerisation of alpha-olefins, comprising such a cocatalytic composition—and a solid based on titanium trichloride complexed with an electron-donating compound.

21 Claims, No Drawings

COCATALYTIC COMPOSITION WHICH IS USABLE FOR THE POLYMERIZATION OF ALPHA-OLEFINS

The present invention relates to cocatalytic compositions which are usable for the polymerisation of alpha-olefins. It also relates to catalytic systems comprising these compositions, as well as to solids containing a titanium halide. It further relates to a process for the polymerisation of alpha-olefins, especially for the stereospecific polymerisation of propylene, performed in the presence of these systems.

It is known to polymerise alpha-olefins such as propylene stereospecifically by means of catalytic systems comprising a cocatalyst consisting of an organometallic compound, such as an optionally halogenated alkylaluminium compound, together with a solid constituent containing a titanium halide.

It is known that, among halogenated alkylaluminium compounds, alkylaluminium dihalides are not suitable for the stereospecific polymerisation of alphaolefins except when electron-donating compounds are added to them (A. D. Ketley, The Stereochemistry of Macromolecules, volume 1, 1967, pages 24 and 27). The halogenated alkylaluminium compounds which are preferred, because they confer maximum stereospecificity on the abovementioned catalytic systems, are dialkylaluminium halides purified so as to remove from them harmful impurities such as trialkylaluminiums and dialkylaluminium hydrides [see, for example, U.S. Pat. No. 3,100,218 (MONSANTO CHEM. CO.)].

Numerous catalytic systems of this type are described in the literature. For example, a description has been given in Patent CS-A-120,142 (JIRI MEJZLIK et al.), as summarised in Chemical Abstracts, volume 68, 1968, page 5, reference 65996 g, of the polymerisation of propylene in the presence of a catalytic system comprising a titanium trichloride and diethylaluminium chloride with the addition of 1 to 30% of the weight of the latter of ethylaluminium dichloride. The increase in stereospecificity obtained is accompanied by a decrease in productivity.

In U.S. Pat. No. 4,400,494, a description has been given of the polymerisation of propylene in the gaseous phase in the presence of a catalytic system comprising a constituent containing reduced titanium and an alkylaluminium halide in which the atomic ratio halogen/aluminium is between 0.89 and 0.98. The presence of additives supplementing these systems, recommended in this patent (column 5, lines 26 to 38), makes them unstable.

Moreover, Example 1 of Patent Application EP-A-0,069,461 (TOA NENRYO KOGYO) describes the polymerisation of propylene in the presence of a system comprising a solid catalytic constituent based on complexed titanium trichloride, diethylaluminium chloride and ethyl benzoate, diethylaluminium chloride being used in the proportion of 15 moles per gram-atom of titanium present in the solid catalytic constituent, and ethyl benzoate in the proportion of 0.02 mole per mole of diethylaluminium chloride. The polymer obtained must be purified in respect of catalytic residues.

A description has also been given, in the publication of Patent Application JA-A-7231703 (TOKUYAMA SODA), of the polymerisation of propylene in the liquid monomer in the presence of a mixture of titanium trichloride and a dialkylaluminium halide, to which were added 0.001 to 0.1 mole of alkylaluminium dihalide per mole of dialkylaluminium halide and, optionally, a compound selected from polyamides and polyethers. While these systems appear to improve the mechanical properties of the polymer obtained, the incorporation of the alkylaluminium dihalide has no beneficial effect on stereospecificity. It is found, in addition, that the productivity of the catalytic system decreases when the quantity of alkylaluminium dihalide increases.

French Patent Application FR-A-2,551,759 (NORTHERN PETROCHEMICAL Co.) describes the polymerisation of propylene in the presence of a catalytic system formed by successively mixing a compound comprising titanium trichloride cocrystallised with aluminium trichloride, modified by grinding with butyl benzoate and washed with liquid propylene, butyl benzoate and diethylaluminium chloride. To increase the productivity of these catalytic systems, an ethylaluminium chloride of atomic ratio (Cl)/(Al) less than 1 is used.

Most of the catalytic systems described above involve the polymerisation of propylene in the presence of a catalytic solid based on a titanium halide, a halogenated organoaluminium compound and an electron-donating compound. Given their industrial importance, these catalytic systems, and especially mixtures comprising an organoaluminium compound and an electron-donating compound, have been the subject of numerous theoretical studies (see, for example, S. Pasynkiewicz, Pure Appl. Chem., 1972, 30, pp. 509–521 and K. B. Starowieyski et al., J. Organomet. Chem., 1976, 117, pp. C1 to C3). It emerges from these studies that bringing an organoaluminium compound into contact with an electron-donating compound gives rise to the formation of unstable complexes which degrade to form a complex mixture which changes over time. The preparation of such solutions a long time before their use in polymerisation is consequently difficult to envisage.

The present invention is directed towards the provision of cocatalytic compositions capable of being stored for fairly long periods without their catalytic efficacy being impaired, and which do not possess the drawbacks inherent in the use of known catalysts possessing excellent catalytic properties.

It has thus been found that the combination of certain halogenated organoaluminium compounds with particular electron-donating organic compounds in specified ratios leads to new cocatalytic compositions which are easy to use in polymerisation and whose catalytic efficacy is not impaired during storage for several weeks or even several months.

It has also been found that the combination of these compositions with certain catalytic solids containing a titanium halide enables catalytic systems providing for an ideal compromise between productivity and stereospecificity to be obtained without the need to employ large quantities of electron-donating compound.

The present invention consequently relates, as its main feature, to a cocatalytic composition resulting from bringing an organoaluminium halide (A) into contact with a particular electron-donating organic compound (ED) selected from esters, amides and ketones, the organoaluminium halide (A) possessing an atomic ratio halogen (X)/aluminium (Al) of greater than 1 and less than 1.3, the halide (A) and the compound (ED) being employed in a mole ratio halide (A)/compound (ED) of greater than 20.

The organoaluminium halide (A) which is usable for preparing the cocatalytic composition according to the invention may be represented by the overall formula:

$$Al R^1_m R^2_n X_p \quad (I)$$

in which
R¹ and R² represent identical or different hydrocarbon radicals selected from alkyl, alkenyl, cycloalkyl, aryl, arylalkyl, alkylaryl, alkoxy and aryloxy radicals;
X is a halogen;
m and n each represent any number such that $0 \leq m < 2$ and $0 \leq n < 2$, and p represents a number such that $1 < p < 1.3$, the sum of m, n and p equalling 3.

In the formula (I), R¹ and R² are preferably selected from alkyl, alkoxy and aryloxy radicals, X is preferably chlorine, m preferably represents a number such that $1 \leq m \leq 1.95$ and p preferably represents a number such that $1 < p < 1.15$.

In the formula (I), R¹ may be selected most especially from linear or branched alkyl radicals containing from 2 to 8 carbon atoms and R² most especially from these radicals and optionally substituted aryloxy radicals containing from 6 to 35 carbon atoms.

In the formula (I), p is generally greater than 1.005, preferably greater than 1.01 and most especially greater than 1.015. In this formula (I), p is generally less than 1.1, preferably less than 1.08 and most especially less than 1.06.

As shown, in particular, by the values assigned to p in the formula (I), the organoaluminium halide (A) which is usable according to the invention is not a pure, defined organoaluminium compound but a mixture of different organoaluminium compounds in quantities suitable for obtaining compositions possessing an atomic ratio (X)/(Al) of greater than 1 and less than 1.3 and whose empirical structure corresponds to the formula (I).

As examples of halides (A) corresponding to the overall formula (I), there may be mentioned alkylaluminium halides such as ethyl-, n-propyl- and i-butylaluminium chlorides, ethylaluminium fluorides, bromides and iodides, alkoxyaluminium halides such as ethoxyaluminium chlorides and mixtures of the above compounds in suitable proportions.

Other examples of halides (A) comprise alkylalkoxyaluminium halides and alkylaryloxyaluminium halides; these compounds may be obtained in a known manner by reaction of halogenated alkylaluminium compounds with an alcohol, a phenol or oxygen; as alkylalkoxyaluminium halides which are usable, ethylethoxyaluminium chloride, isobutylethoxyaluminium chloride, ethylbutoxyaluminium chloride and mixtures thereof may be mentioned; as alkylaryloxyaluminium halides which are usable, ethylphenoxyaluminium chloride may be mentioned.

A special class of halides (A) comprises the products of the reaction of halogenated alkylaluminium compounds with hydroxyaromatic compounds in which the hydroxyl group is sterically hindered, as well as mixtures of these products with the halogenated alkylaluminium compounds from which they are derived.

The hydroxyaromatic compounds in which the hydroxyl group is sterically hindered are generally selected from mono- or polycyclic hydroxyarylenes substituted with a secondary or tertiary alkyl radical in both ortho positions with respect to the hydroxyl group, and preferably from phenols di-tert-alkylated in the ortho positions with respect to the hydroxyl groups and esters of 3-(3,5-di-tert-butyl-4-hydroxyphenyl)propionic acid. Among these compounds, the best results have been obtained with n-octadecyl 3-(3,5-di-tert-butyl-4-hydroxyphenyl)propionate and with 2,6-di-tert-butyl-4-methylphenol.

To obtain such organoaluminium halides (A), the halogenated alkylaluminium compound having a suitable halogen content and the hydroxyaromatic compound may be brought into contact beforehand in the mole ratio halogenated alkylaluminium compound/hydroxyaromatic compound of between 100 and 1, preferably between 60 and 5 and especially between 50 and 10, in an inert hydrocarbon diluent, for the time needed for at least partial formation of the said reaction product, which can take between 5 minutes and 24 hours and is most often accompanied by an evolution of gas, enabling the progress of the reaction to be assessed.

Among all the organoaluminium halides (A) defined and listed above, the best results are obtained with alkylaluminium chlorides (A), especially with ethylaluminium chlorides, possessing an atomic ratio chlorine/aluminium of greater than 1.005, preferably greater than 1.01 and more especially greater than 1.015, and less than 1.1, preferably less than 1.08 and more especially less than 1.06. These chlorides may be obtained by mixing in suitable proportions alkylaluminium mono- and dichloride or trialkylaluminium and alkylaluminium dichloride, the alkyl radicals of these compounds preferably being identical and typically an ethyl radical.

The particular electron-donating organic compound (ED) which is usable for preparing the cocatalytic composition according to the invention is selected from esters, amides and ketones. The esters and amides can be esters and amides of mono- and polycarboxylic acids, in particular esters and amides of aliphatic carboxylic acids, esters and amides of olefinic carboxylic acids, esters and amides of alicyclic carboxylic acids and esters and amides of aromatic carboxylic acids. Esters of 3-(3,5-di-tert-butyl-4-hydroxyphenyl)propionicacid, mentioned above, are also suitable. The amides can be mono- or disubstituted on the nitrogen atom, in particular with alkyl and phenyl radicals.

As esters which are usable, there may be mentioned methyl acetate, ethyl acetate, phenyl acetate, ethyl chloroacetate, methyl propionate, ethyl butyrate, ethyl valerate, methyl acrylate, ethyl acrylate, methyl methacrylate, ethyl benzoate, butyl benzoate, methyl toluate, ethyl toluate, ethyl anisate, diethyl succinate, dibutyl succinate, diethyl malonate, dibutyl malonate, dimethyl malonate, dibutyl maleate, diethyl itaconate, dibutyl itaconate, monoethyl phthalate, dimethyl phthalate, ethylmethyl phthalate, diethyl phthalate, di-n-propyl phthalate, diisobutyl phthalate, di-n-hexyl phthalate, di-n-octyl phthalate and diphenyl phthalate.

As amides which are usable, there may be mentioned formamide, acetamide, propionamide, n-butyramide, n-valeramide, n-caproamide, lauramide, stearamide, dimethylformamide, N-methylacetamide, N,N-dimethylacetamide, chloroacetamide, acrylamide, methacrylamide, β,β-dimethylacrylamide, adipamide, benzamide, phthalamide, N,N-dimethylbenzamide, benzanilide and N,N-diphenylbenzamide.

As ketones which are usable, there may be mentioned acetone, methyl ethyl ketone, methyl isobutyl ketone, acetylacetone, propiophenone, acetophenone and benzophenone.

Very good results are obtained with esters of aromatic carboxylic acids, such as benzoates, toluates and phthalates. The amides derived from aromatic carboxylic acids, such as benzamide or phthalamide, substituted or otherwise, are also very suitable. Advantageously, electron donors which are liquid at room temperature are used. Liquid aromatic carboxylic acid esters are very suitable. It is preferable to use an aromatic carboxylic acid ester which is soluble in alkylaluminium compounds. Ethyl benzoate is most especially preferred as an electron-donating compound (ED).

It is self-evident that, for the preparation of the cocatalytic composition according to the invention, the use of several organoaluminium halides (A) and several electron-donating compounds ED is in no way ruled out.

The general conditions of formation of the cocatalytic composition according to the invention are not critical, insofar as they lead to a final product containing a large excess, as defined below, of the halide (A) relative to the compound (ED).

In general, contact of the halide (A) and the compound (ED) with one another is established in the liquid phase. Since the cocatalytic composition of the invention consists essentially of the product resulting from bringing the halide (A) and the compound (ED) into contact, this contacting is performed under non-polymerising conditions, that is to say in the absence of polymerisable alpha-olefin and/or of catalytic solid containing a titanium halide.

This contacting may be carried out in the presence of an inert diluent. In this case, a diluent is selected in which at least one of the compounds involved is soluble. When a diluent is used, it is preferable that the total concentration of dissolved compounds is not less than 5% by weight, and especially preferable that it is between 5 and 20% by weight. This diluent is generally selected from liquid aliphatic, cycloaliphatic and aromatic hydrocarbons such as liquid alkanes, isoalkanes and cycloalkanes and benzene.

The halide (A) and the compound (ED) which are preferred according to the invention are soluble in these diluents.

It is also possible to carry out the contacting of the halide (A) and the compound (ED) with one another, and this constitutes a preferred embodiment of the invention, in the absence of a diluent, by selecting temperature and pressure conditions such that at least one of the compounds involved is in the liquid state. The halide (A) and the compound (ED) are often liquid, and/or each of them often capable of dissolving the other under normal temperature and pressure conditions. Under these same conditions, the cocatalytic composition obtained itself often also takes liquid form. Preferably, this cocatalytic composition takes the form of a homogeneous liquid. This form is advantageous inasmuch as it permits the storage, transport and ready handling of the cocatalytic compositions in small volumes. It is also advantageous in the context of the use of these compositions in polymerisation processes performed without a diluent, especially in the processes of polymerisation of propylene performed in the monomer maintained in the liquid state or in the gaseous phase.

As regards the method of bringing the halide (A) and the compound (ED) into contact to form the cocatalytic composition according to the invention, account should be taken of what has been mentioned above, namely that the halide (A) is not a pure, defined compound but results from the mixing of organoaluminium compounds in proportions selected to lead to an atomic ratio (X) (Al) of greater than 1 and less than 1.3 and so that their empirical composition corresponds to the formula (I). If henceforward a less halogenated or unhalogenated organoaluminium compound used for preparing the halide (A) is designated (AA) and a more halogenated organoaluminium compound used for preparing the halide (A) is designated (AB), it is possible:

to bring the compound (ED) into contact with the halide (A) preformed by prior mixing, in appropriate quantities, of the compounds (AA) and (AB);

when the compound (AB) is present in excess relative to the other two, to introduce into it, successively and in appropriate quantities, the compound (AA) for the "in situ" formation of the halide (A) and then the compound (ED); or to introduce into it, successively and in appropriate quantities, the compound (ED) and then the compound (AA).

The first method of formation of the cocatalytic composition defined above is the preferred one.

The compounds involved in the formation of the cocatalytic composition according to the invention are brought into contact with one another at temperatures generally between approximately 0° and 90° C., and preferably at a temperature in the region of room temperature (25° C.).

The use of the halide (A) and the compound (ED) for preparing the cocatalytic composition according to the invention is implemented in the high mole ratio halide (A)/compound (ED) mentioned above.

This mole ratio of the halide (A) to the compound ED) is greater than 20 and preferably greater than 30. This mole ratio is advantageously greater than 35 and most often greater than 50, the best results being obtained when it is at least 52. In general, the mole ratio (A)/(ED) does not exceed approximately 150, and it often does not exceed approximately 90. In most cases, the mole ratio (A)/(ED) does not exceed 75.

The mole ratios (A)/(ED) can thus be generally between 35 and 150, and often between 40 and 90. When the halide (A) and the compound (ED) are employed in the form of undiluted liquids to obtain a liquid cocatalytic composition, these mole ratios are often greater than 50 and preferably at least 52 without exceeding 90, and most especially between 52 and 75. The cocatalytic compositions which yield the best productivity/stereoselectivity compromise are obtained by adding a liquid aromatic carboxylic acid ester, and more especially ethyl benzoate, to an alkylaluminium chloride of atomic ratio (Cl)/(Al) between 1.01 and 1.06, in proportions such that the mole ratio halide (A)/compound (ED) is between 52 and 75.

The preparation of the cocatalytic composition according to the invention can advantageously be completed by maintaining it at room temperature (approximately 25° C.) for a period of at least 30 minutes (ageing phase) when it is intended that it should be brought into contact, as soon as its preparation is complete, with a solid constituent containing a titanium halide. The ageing phase advantageously lasts at least approximately 1 hour at room temperature. The cocatalytic composition thereby obtained possesses a complex chemical composition which is variable over time, resulting from the complexing reactions between the different constituents and from the degradation of these complexes. Despite these different reactions, the cocatalytic composition of the invention may be stored without losing its catalytic properties.

Thus, it may be stored for several months, up to temperatures of the order of 50° C., without its catalytic properties being substantially modified.

The cocatalytic compositions described above may be used, and this constitutes a second aspect of the invention, in combination with solids containing a titanium halide, to form catalytic systems which are usable for polymerising alpha-olefins.

The titanium halide contained in these solids can be the main constituent thereof or can represent only a part, even a minor part, of the total chemical composition of these solids. This titanium halide is preferably a chloride, especially a tetra- or trichloride.

Examples of solids in which the titanium halide represents only a minor part in the chemical composition are so-called "supported" catalysts. The support for the halide is generally inorganic in nature. Magnesium halides, especially magnesium chlorides, the X-ray diffraction spectrum of which differs from the normal spectrum of this compound, are frequently used for this purpose.

Both the support and the titanium halide can be combined with or can contain electron-donating compounds, especially esters.

Examples of solids in which the titanium halide is the main constituent are solids in which more than 50% of the total weight, and often more than 60% of the total weight, consists of solid titanium halide. Preferably, this halide is titanium trichloride, most especially titanium trichloride complexed with an electron-donating compound. These solids are preferred as constituents of the catalytic systems according to the invention.

These solids may be obtained by any known process.

It is generally preferably to use a solid obtained by a process involving an initial reduction of a titanium compound selected from the tetrahalides and compounds of the tetra(hydrocarbon radical-oxy)titanium type and mixtures thereof. As examples of titanium tetrahalides, the tetraiodide, tetrabromide and tetrachloride may be mentioned. As examples of compounds of the tetra(hydrocarbon radical-oxy)titanium type, there may be mentioned the tetraalkoxides such as tetramethoxy-, tetraisopropoxy- and tetra-n-butoxytitaniums; and the tetraaryloxides such as tetraphenoxy-, tetracresyloxy- and tetranaphthyloxytitaniums, for example.

Among the titanium compounds mentioned above, preference is given to the titanium tetrahalides, and among the latter, titanium tetrachloride.

The reduction may be performed with the participation of hydrogen or of metals such as magnesium and, preferably, aluminium, especially when the titanium compound is a titanium tetrahalide. It is nevertheless preferable to perform the reduction of the titanium compound with participation of an organometallic reducing agent, which can be, for example, an organomagnesium reducing agent.

The best results are obtained when the reduction of the titanium compound is performed with the participation of organoaluminium reducing agents.

The organoaluminium reducing agents which are preferably usable are compounds which contain at least one hydrocarbon radical bound directly to the aluminium atom. Examples of compounds of this type are mono-, di- and trialkylaluminiums in which the alkyl radicals contain from 1 to 12, and preferably from 1 to 6, carbon atoms, such as triethylaluminium, the isoprenylaluminiums, diisobutylaluminium hydride and ethoxydiethylaluminium. With the compounds of this type, the best results are obtained with alkylaluminium chlorides, especially with diethylaluminium chloride and with ethylaluminium sesquichloride.

To obtain the solid constituents of the catalytic systems which are usable according to the invention, the reduced solids mentioned above are subjected to a treatment by means of at least one complexing agent, which is generally selected from organic compounds comprising one or more atoms or groups possessing one or more lone pairs of electrons capable of providing for coordination with the titanium or aluminium atoms present in the titanium or aluminium compounds defined above. Preferably, the complexing agent is selected from the family of aliphatic ethers, and more especially from those in which the aliphatic radicals comprise from 2 to 8 carbon atoms, and preferably 4 to 6 carbon atoms. A typical example of an aliphatic ether giving very good results is diisoamyl ether.

These treatments by means of complexing agents, designed to stabilise or improve the productivity and/or stereospecificity of the catalytic solids, are well known and have been fully described in the literature.

Thus, the treatment by means of the complexing agent may consist in grinding the reduced solid in the presence of the complexing agent. It may consist of a thermal treatment of the reduced solid in the presence of the complexing agent. It may also consist of extractive washes of reduced solid in the presence of mixed solvents comprising a liquid hydrocarbon compound and a polar auxiliary solvent, for example an ether. It is also possible to perform the reduction of the titanium compound, especially the tetrachloride, with the organoaluminium reducing agent in the presence of the complexing agent, for example by adding to the titanium tetrachloride a solution in a hydrocarbon of the product of the reaction of the complexing agent with this reducing agent, and then to subject the reduced solid thereby obtained to a thermal treatment in the absence of complexing agent, or in the presence of a further quantity of complexing agent identical to or different from the previous one. It is also possible to perform the treatment by means of the complexing agent with a quantity of the latter sufficient to form a homogeneous solution of solid based on titanium trichloride and to reprecipitate, by heating, the solid thus dissolved.

For the preparation of the solid constituent of the catalytic systems according to the invention, the treatment by means of the complexing agent may be combined with or followed by an activation treatment. These activation treatments are also well known and have also been described in the literature. They are generally performed by means of at least one agent selected from inorganic halogen compounds, organic halogen compounds, interhalogen compounds and halogens. Among these agents, there may be mentioned:

as inorganic halogen compounds, metal and non-metal halides such as titanium and silicon halides, for example;

as organic halogen compounds, halogenated hydrocarbons such as halogenated alkanes and carbon tetrahalides, for example;

as interhalogen compounds, iodine chloride and bromide, for example;

as halogen, chlorine, bromine and iodine.

Examples of agents which are very suitable for the activation treatment are titanium tetrachloride, silicon tetrachloride, iodobutane, monochloroethane, hexachloroethane, chloromethylbenzene, carbon tetrachloride, iodine chloride and iodine. The best results have been obtained with titanium tetrachloride.

The physical form in which the complexing agents and the agents used for the possible activation treatment occur is not critical for the preparation of the precursor. These agents may be employed in gaseous form or in liquid form, the latter being the form they most commonly take under the usual conditions of temperature and pressure. It is also possible to perform the treatment by means of the complexing agent and the possible activation treatment in the presence of an inert hydrocarbon diluent, such as those defined above in relation to the preparation of the cocatalytic composition, generally selected from liquid aliphatic, cycloaliphatic and aromatic hydrocarbons such as liquid alkanes and isoalkanes and benzene.

Details relating to the working conditions for the commonest complexing and activation treatments may be found, in particular, in Patents BE-A-780,758 (SOLVAY & Cie), BE-A-864,708 (SUMITOMO CHEMICAL COMPANY LTD), U.S. Pat. No. 4,368,304 (CHISSO CORPORATION) and U.S. Pat. No. 4,295,991 EXXON RESEARCH AND ENGINEERING CO.), as well as in the documents cited in the latter.

At any time during its preparation, after the reduction or complexing step or after the possible activation step, but preferably after the reduction step, the solid constituent of the catalytic system may be subjected to a treatment aimed at decreasing the friability of its constituent particles. This treatment, referred to as "prepolymerisation", consists in bringing the solid into contact with a lower alpha-monoolefin such as ethylene or, better, propylene, under polymerising conditions so as to obtain a solid generally containing between 5 and 500% by weight approximately of "prepolymerised" alpha-monoolefin relative to the weight of titanium halide which it contains. This "prepolymerisation" may advantageously be performed in a suspension of the solid in the inert hydrocarbon diluent as defined above, for a sufficient time to obtain the desired quantity of prepolymerised alpha-monoolefin on the solid. The solid constituent contained according to this variant is less friable, and enables polymers of good morphology to be obtained even when polymerisation is performed at relatively high temperature.

In addition, at any time during its preparation, but preferably after the activation step when the latter is undertaken, the solid constituent may be subjected to an additional activation treatment aimed at maintaining the stability of its properties and/or aimed at increasing its stereospecificity. This additional activation treatment consists in bringing the solid constituent, preferably separated from the medium in which it has been prepared and washed with an inert hydrocarbon diluent as defined above, into contact with an activating agent selected from organoaluminium compounds and the products of the reaction of an organoaluminium compound with a compound selected from hydroxyaromatic compounds in which the hydroxyl group is sterically hindered. The organoaluminium compound is preferably selected from trialkylaluminiums and alkylaluminium chlorides. Among these compounds, the best results have been obtained with diethylaluminium chloride. The hydroxyaromatic compound corresponds to the same definitions and limitations as those stated above in relation to the nature of the halide (A).

Further details in relation to the additional activation treatment defined above, in particular in relation to the nature of the organoaluminium and hydroxyaromatic compounds, with the working conditions under which this treatment is performed and with the texture of the preactivated solid obtained, will be found in Patents BE-A-803,875 (SOLVAY & Cie) and FR-A-2,604,439 (SOLVAY & Cie), the content of which is incorporated by reference in the present description.

A preferred method of preparation of the solid participating in the composition of the catalytic system which is usable according to the invention has been described in Patent BE-A-780,758 (SOLVAY & Cie).

This method comprises the reduction of titanium tetrachloride by means of an organoaluminium reducing agent which, in this instance, is preferably a dialkylaluminium chloride in which the alkyl chains comprise from 2 to 6 carbon atoms, under mild conditions. After an optional thermal treatment of the reduced solid thereby obtained, the latter is subjected to a treatment by means of a complexing agent as defined above. Lastly, a treatment by means of titanium tetrachloride is carried out, and the solid based on complexed titanium trichloride thereby formed is separated and washed, generally be means of an inert hydrocarbon diluent as defined above, preferably selected from liquid aliphatic hydrocarbons comprising from 3 to 12 carbon atoms and which is, moreover, the diluent which may be used throughout the preparation of the said solid.

The preferred method of preparation defined in the above paragraph leads to particles of solid based on complexed titanium trichloride which are also described in Patent BE-A-780,758. These particles are spherical and generally have a diameter of between 5 and 100 microns, and most often between 10 and 50 microns. They consist of an agglomerate of microparticles, also spherical, which have a diameter of between 0.05 and 1 micron, and most often between 0.1 and 0.3 micron, and which are extremely porous. As a result, the particles possess a specific surface area larger than 75 m²/g and lying most often between 100 and 250 m²/g, and a total porosity larger than 0.15 cm³/g and mostly between 0.20 and 0.35 cm³/g. The internal porosity of the microparticles constitutes the largest contribution to this total porosity of the particles, as borne out by the high value of the pore volume corresponding to pores less than 200 in diameter, which is larger than 0.11 cm³/g and mostly between 0.16 and 0.31 cm³/g.

The solids based on complexed titanium trichloride (constituent (a)) obtained according to the method of preparation described in Patent BE-A-780,758, selecting the preferred operating conditions, correspond to the formula:

$$TiCl_3.(AlRCl_2)_x.C_y$$

where R is an alkyl radical comprising from 2 to 6 carbon atoms, C is a complexing agent as defined above, x is any number less than 0.20 and y any number greater than 0.009, and generally less than 0.20.

As variants of this method of preparation, those referred to above may be mentioned, consisting in:
"prepolymerising" the reduced solid, after the optional thermal treatment and before the treatment by means of the complexing agent, with a lower alpha-monoolefin (propylene) under polymerising conditions. This "prepolymerisation" is performed in a suspension of the reduced solid in the inert hydrocarbon diluent as defined above, at between 20° and 80° C. approximately, for a time generally between 1 minute and 1 hour;

undertaking an additional activation treatment of the solid, by introducing a solution of the product of the reaction of the organoaluminium compound and the hydroxyaromatic compound into a suspension in a hydrocarbon of the constituent (a) then maintained at a temperature preferably of between 20° and 40° C. approximately for a time preferably of between 15 and 90 minutes.

These variants may be employed separately or in combination.

Irrespective of the variant(s) adopted for the preparation of the solid constituent of the catalytic system, and as mentioned above, the latter is finally separated from its formation medium and generally then washed by means of an inert hydrocarbon diluent of the same nature as those with whose participation it has, where appropriate, been prepared.

The solid constituent of the catalytic system which is usable according to the invention, separated and washed, may then be optionally dried in a conventional manner, for example according to the method described in Patent BE-A-846,911 (SOLVAY & Cie).

After it has been washed and optionally dried, the solid constituent of the catalytic system according to the invention may be immediately brought into contact again with an inert hydrocarbon diluent such as those which have been defined above, and which are also usable as diluents in the suspension polymerisation. It may be stored in such a diluent or in dry form, preferably in the cold state, for long periods, without losing its qualities. It may also be stored in the form of a suspension in a mineral oil or a silicone oil.

The invention also relates to a process for the polymerisation of alpha-olefins performed in the presence of the catalytic systems described above. To this end, the cocatalytic composition and the solid constituent containing a titanium halide may be brought into contact with one another before being introduced into the polymerisation medium, or be added separately to this medium.

Precontact, when it is performed, is generally carried out at a temperature of between −40° and 80° C., for a time which is dependent on this temperature and which can range from a few seconds to several hours or even several days.

The catalytic systems comprising the solid constituent and the cocatalytic composition, defined and combined as described above, are applied to the polymerisation of terminally unsaturated olefins, the molecule of which contains from 2 to 18 and preferably from 2 to 6 carbon atoms, such as ethylene, propylene, 1-butene, 1-pentene, methyl-1-butene, 1-hexene, 3- and 4-methyl-1-pentenes and vinylcyclohexene. They are especially advantageous for the stereospecific polymerisation of propylene, 1-butene and 4-methyl-1-pentene to strongly isotactic, crystalline polymers.

They are also applied to the copolymerisation of these alpha-olefins with one another, as well as with diolefins comprising from 4 to 18 carbon atoms. Preferably, the diolefins are unconjugated aliphatic diolefins such as 1,4-hexadiene, unconjugated monocyclic diolefins such as 4-vinylcyclohexene, alicyclic diolefins having an endocyclic bridge, such as dicyclopentadiene and methylene- and ethylidenenorbornene, and conjugated aliphatic diolefins such as butadiene or isoprene.

They are further applied to the manufacture of copolymers referred to as block copolymers, which are formed from alpha-olefins and diolefins. These block copolymers consist of successions of chain segments having variable lengths; each segment consists of a homopolymer of an alpha-olefin or a statistical copolymer comprising an alpha-olefin and at least one comonomer selected from alpha-olefins and diolefins. The alphaolefins and diolefins are selected from those mentioned above.

The catalytic systems according to the invention are especially well suited to the manufacture of homopolymers of propylene and of copolymers containing in total at least 50% by weight of propylene, and preferably 75% by weight of propylene.

The polymerisation may be performed according to any known process: in solution or in suspension in a solvent or an inert hydrocarbon diluent, such as those defined in relation to the preparation of the cocatalytic composition and which is preferably selected from butane, pentane, hexane, heptane, cyclohexane, methylcyclohexane or mixtures thereof. In these processes, it is possible, without discrimination, to use the cocatalytic composition in the form of a solution in the same diluent or to introduce it in the pure form into the polymerisation medium. It is also possible to carry out the polymerisation in the monomer or one of the monomers maintained in the liquid state or alternatively in the gaseous phase. In this case, it is preferable to use the cocatalytic composition in pure form (without a diluent).

The polymerisation temperature is generally selected at between 20° and 200° C., and preferably between 50° and 90° C., the best results being obtained at between 65° and 85° C. The pressure is generally selected at between atmospheric pressure and 80 atmospheres, and preferably between 10 and 50 atmospheres. This pressure is naturally dependent on the temperature used.

The polymerisation may be performed in continuous or discontinuous fashion.

The preparation of so-called block copolymers may also be carried out according to known processes. It is preferable to use a two-step process, consisting in polymerising an alpha-olefin, generally propylene, according to the method described above for homopolymerisation. The other alpha-olefin and/or diolefin, generally ethylene, is then polymerised in the presence of the still active homopolymer chain. This second polymerisation may be carried out after completely or partially removing the monomer which has not reacted during the first step.

The quantity of solid constituent employed is determined in accordance with its $TiCl_3$ content. It is generally selected in such a way that the concentration of the polymerisation medium is greater than 0.01 mmol of $TiCl_3$ per liter of diluent, of liquid monomer or of reactor volume, and preferably greater than 0.05 mmol per liter.

The total quantity of cocatalytic composition employed is not critical; expressed with respect to the organoaluminium halide (A) which it contains, this quantity is generally greater than 0.1 mmol per liter of diluent, of liquid monomer or of reactor volume, and preferably greater than 0.5 mmol per liter.

The ratio of quantities of solid constituent and cocatalytic composition is not critical either. These quantities are generally selected in such a way that the mole ratio of the quantity of organoaluminium halide (A) present in the composition to the quantity of titanium trichloride present in the solid constituent is between 1 and 30 mole/mole, and preferably between 5 and 25 mole/mole. Under these conditions, and in view of the relatively small quantity of compound (ED) which the cocatalytic composition can contain (see above), the mole ratio of this compound (ED) to titanium trichloride in the catalytic system can be maintained at very low values also, advantageously less than unity and preferably between 0.1 and 0.5, thereby avoiding any undesirable side effect on the catalytic properties.

The molecular weight of the polymers manufactured according to the process of the invention may be adjusted by adding to the polymerisation medium one or more molecular weight-adjusting agents such as hydrogen, diethylzinc, alcohols, ethers and alkyl halides.

The examples which follow serve to illustrate the invention.

The meaning of the symbols used in these examples, the units expressing the parameters mentioned and the methods of measurement of these parameters are clarified below.

$\alpha$ = catalytic activity expressed conventionally as grams of polymer insoluble in the polymerisation medium, obtained per hour and per gram of $TiCl_3$ contained in the preactivated catalytic solid. This activity is assessed indirectly from determination of the residual titanium content of the polymer by X-ray fluorescence.

fit = mole fraction of isotactic triads (sequenced linkage of three monomeric propylene units in meso configuration) of the total polymer. This fraction is determined by $^{13}C$ NMR as described in Macromolecules, volume 6, No. 6, page 925 (1973) and in references (3) to (9) of this publication.

I.I = isotacticity index of the polymer, assessed by the fraction of the latter, expressed in % relative to the total quantity of the solid polymer collected, which is insoluble in boiling heptane.

G = modulus of rigidity in torsion of the polymer, measured at 100° C. and for a torsional angle of 60° of arc, the temperature of the mould being fixed at 70° C. and the time of conditioning at 5 minutes (Standards BS 2782 - part I - method 150A; ISO 458/1, method B; DIN 53447 and ASTM D 1043). This modulus is expressed in $daN/cm^2$.

MFI = melt flow index measured under a load of 2.16 kg at 230° C. and expressed in g/10 min (ASTM Standard D 1238).

ASG = apparent specific gravity of the insoluble polymer fraction, measured by packing down and expressed in g/l.

EXAMPLES 1 AND 2 AND EXAMPLES 3R TO 5R (Examples 3R to 5R are given by way of comparison)

A. Preparation of the solid constituent based on complexed titanium trichloride

1. Reduction 90 ml of dry hexane and 60 ml of pure $TiCl_4$ are introduced under a nitrogen atmosphere into an 800-ml reactor equipped with a 2-bladed stirrer rotating at 400 rpm. This hexane/$TiCl_4$ solution is cooled to 0 ($\pm$1)° C. In the course of 4 h, a solution consisting of 190 ml of hexane and 70 ml of diethylaluminium chloride (DEAC) is added while the temperature of 0 ($\pm$1)° C. is maintained in the reactor.

After addition of the DEAC/hexane solution, the reaction medium consisting of a suspension of fine particles is kept stirring at 0 ($\pm$1)° C. for 15 min, is then brought to 25° C. in the course of 1 h and maintained at this temperature for 1 h and thereafter brought to 65° C. in the course of approximately 1 h. The medium is kept stirring for 2 h at 65° C..

2. Prepolymerisation

The suspension obtained is then cooled to approximately 55° C. Propylene at a pressure of 2 bars is then introduced into the gaseous atmosphere of the reactor. This introduction is continued for sufficient time (approximately 45 minutes) to obtain 70 g of polymerised propylene per kg of solid. The suspension of solid thus "prepolymerised" is then cooled to 40° C.

The liquid phase is then separated from the solid and the solid product is washed 7 times by means of 200 ml of dry hexane, with resuspension of the solid at each wash.

3. Treatment with the complexing agent

The "prepolymerised" reduced solid obtained is suspended in 456 ml of diluent (hexane), and 86 ml of diisoamyl ether (DIAE) are added. The suspension is stirred for 1 h at 50° C. The solid thus treated is then separated from the liquid phase.

4. Treatment with $TiCl_4$

The treated solid is resuspended in 210 ml of hexane, and 52 ml of $TiCl_4$ are added; the suspension is kept stirring (150 rpm) at 70° C. for 2 h. The liquid phase is then removed by filtration and the solid (precursor) based on complexed titanium trichloride is washed 14 times with 270 ml of hexane.

5. Preactivation 74 g of the solid precursor (containing approximately 780 g of $TiCl_3$/kg) suspended in 280 ml of hexane, are introduced into an 800-ml reactor equipped with a paddle stirrer rotating at 150 rpm. 120 ml of a solution in hexane of a preactivator, prepared beforehand by mixing, per liter of hexane, 80 g of DEAC (compound (D)) and 176.2 g of n-octadecyl 3-(3,5-di-tert-butyl-4-hydroxyphenyl)propionate marketed by CIBA-GEIGY under the name Irganox 1076 (compound (I)), are introduced slowly (30 minutes) into this reactor. The mole ratio between the compounds (D) and (I) employed for preparing the preactivator is hence 2, and the mole ratio of the preactivator to the precursor (expressed in moles of compound (D) initially employed per mole of $TiCl_3$ present in the precursor) is equal to 0.2.

The solution of preactivator is not introduced into the reactor until 15 minutes after the gaseous evolution observed during mixing of the compound (D) and the compound (I) has ceased.

The suspension thus treated with the preactivator is kept stirring for 1 hour at 30° C.

After settling has taken place, the resulting catalytic solid is separated and washed 5 times by means of 100 ml of dry hexane, with resuspension of the solid at each wash, and then dried by the passage of a stream of nitrogen in a fluidised bed at 50° C..

The catalytic solid thereby obtained contains 616 g of $TiCl_3$ per kg.

B. Polymerisation of propylene in suspension in liquid monomer

1. Preparation of the cocatalytic compositions

To carry out Examples 1 and 2, pure liquid ethylaluminium dichloride (EADC) is added to pure liquid diethylaluminium chloride (DEAC) to obtain an ethylaluminium chloride (organoaluminium halide (A)) possessing an atomic ratio (Cl)/(Al) equalling 1.05 (Example 1) and 1.02 (Example 2).

Ethyl benzoate (EB) is added to this ethylaluminium chloride thus preformed, in such a way that the mole ratio of the ethylaluminium chloride to EB is equal to 60 (Example 1) and 57 (Example 2).

The cocatalytic compositions thereby obtained are maintained at 25° C. for 1 hour before being used in polymerisation.

To carry out Examples 3R to 5R (comparative), the procedure is as above except that, during the preparation of the cocatalytic compositions:

EB is added to the ethylaluminium chloride of Example 2 in such a way that the mole ratio of the ethylaluminium chloride to EB is equal to only 20 (Example 3R);

EB is added to pure liquid DEAC (atomic ratio Cl/Al=1.00) in such a way that the mole ratio of the ethylaluminium chloride is equal to 57 (Example 4R);

triethylaluminium is added to pure liquid DEAC to obtain an ethylaluminium chloride possessing an atomic ratio Cl/Al equalling 0.95 (mole ratio of the ethylaluminium chloride to EB =57) (Example 5R).

2. Polymerisation - Reference conditions

The following are introduced under a stream of nitrogen into a 5-1 autoclave dried beforehand and maintained under a dry nitrogen atmosphere:
100 mg of catalytic solid;
a volume of cocatalytic composition such that the atomic ratio of the aluminium which it contains to the titanium contained in the catalytic solid equals approximately 15;
hydrogen under partial pressure of 1 bar;
3 l of liquid propylene.

The reactor is maintained at 70° C. with stirring for 3 hours. The excess propylene is then outgassed and the polypropylene (PP) formed is then recovered.

The results of the polymerisation experiments are collated in Table I below.

TABLE I

| Examples | 1 | 2 | 3R | 4R | 5R(1) |
|---|---|---|---|---|---|
| α | 5447 | 5448 | 4500 | 5447 | 5050 |
| fit | 0.96 | 0.95 | 0.95 | 0.93 | 0.94 |
| I.I | 97.9 | 97.1 | 97.2 | 97 | 96.4 |
| G | 790 | 660 | 690 | 660 | 660 |
| MFI | 8.8 | 3.1 | 5.1 | 4.9 | 3.8 |
| ASG | 510 | 506 | 500 | 489 | 504 |

(1) The cocatalytic composition of this example is unstable, and the stated results are no longer obtained after only two days of ageing.

Examination of this table shows that the best compromise of results is obtained with the systems containing the cocatalytic compositions according to the invention (Examples 1 and 2).

EXAMPLE 6

A cocatalytic composition is prepared by adding to DEAC successively EADC and EB in such a way as to obtain an ethylaluminium chloride of atomic ratio (Cl)/(Al) equal to 1.02, containing 0.017 mole of EB per mole of ethylaluminium chloride. The efficacy of this composition, used in polymerisation under the reference conditions 1 hour after being prepared, is recorded in Table II below.

EXAMPLES 7 TO 12

The cocatalytic composition of Example 6 is divided into three fractions [(a), (b), (c)], which are stored at 0° C., 30° C. and 60° C. respectively, for variable periods before being used in polymerisation under the reference conditions.

Table II records the conditions of storage of these compositions as well as the results of the polymerisation tests.

TABLE II

| Examples | 6 | 7 | 8 | 9 | 10 | 11 | 12 |
|---|---|---|---|---|---|---|---|
| Cocatalytic composition | — | (a) | (a) | (b) | (b) | (c) | (c) |
| Storage temperature (°C.) | — | 0 | 0 | 30 | 30 | 60 | 60 |
| Storage period (days) | 0 | 19 | 60 | 48 | 230 | 37 | 101 |
| Polymerisation results | | | | | | | |
| α | 6089 | 5448 | 5751 | 6089 | 5750 | 5447 | 6469 |
| fit | 0.96 | 0.96 | 0.95 | 0.94 | 0.94 | 0.96 | 0.94 |
| I.I | 97.7 | 96.9 | 96.5 | 97.4 | 96.1 | 98.5 | 95.8 |
| G | 714 | 676 | 688 | 686 | 670 | 648 | 685 |
| MFI | 9 | 4.5 | 7 | 4.5 | 5.1 | 1.3 | 0.9 |
| ASG | 520 | 511 | 506 | 514 | 511 | 508 | 506 |

EXAMPLE 13R

A cocatalytic composition is prepared by adding triethylaluminium and EB successively to DEAC in such a way as to obtain a composition of atomic ratio (Cl)/(Al) equal to 0.97, containing 0.017 mole of EB per mole of ethylaluminium chloride. When tested in polymerisation two days after being prepared (reference conditions), this composition leads to the production, with an activity of 5447, of a sticky polymer whose isotacticity index (I.I) is only 90.4% and in which the mole fraction of isotactic triads (fit), measured by NMR, is only 0.89.

EXAMPLES 14R AND 15R

A cocatalytic composition is prepared by adding EADC and ethylene glycol dimethyl ether (Example 14R) or piperazine (Example 15R) successively to DEAC in such a way as to obtain an ethylaluminium chloride of atomic ratio (Cl)/(Al) equal to 1.02, containing 0.02 mole of electron-donating compound per mole of ethylaluminium chloride.

Since the electron-donating compounds used in these examples are soluble neither in the organoaluminium halides nor in the inert hydrocarbon diluents, it is not possible to obtain homogeneous cocatalytic compositions which are readily usable in polymerisation.

We claim:

1. A cocatalytic composition capable of being stored, resulting from bringing an organoaluminium halide (A) into contact with an electron-donating organic compound (ED) selected from carboxylic acid esters, amides and ketones, the organoaluminium halide (A) having an atomic ratio halogen (X)/aluminium (Al) of greater than 1 and less than 1.3, and the halide (A) and the compound (ED) having a mole ratio halide (A)/compound (ED) of greater than about 20.

2. The cocatalytic composition according to claim 1, consisting essentially of the product resulting from bringing the electron-donating organic compound (ED) and the organoaluminium halide (A) into contact.

3. The composition according to claim 1, wherein the electron-donating organic compound (ED) is brought into contact with the organoaluminium halide (A) in the absence of alpha-olefin.

4. The composition according to claim 1, wherein the electron-donating organic compound (ED) is brought into contact with the organoaluminium halide (A) in the absence of solid containing a titanium halide.

5. The composition according to claim 3, wherein the electron-donating organic compound (ED) is brought into contact with the organoaluminium halide (A) under non-polymerising conditions, in the absence of alpha-olefins and of solid containing a titanium halide.

6. The composition according to claim 1, wherein organoaluminium halide (A) is selected from the compounds corresponding to the overall formula

in which
R$^1$ and R$^2$ represent identical or different radicals selected from alkyl, alkenyl, cycloalkyl, aryl, arylalkyl, alkylaryl, alkoxy and aryloxy radicals and at least one of R$^1$ and R$^2$ represents a hydrocarbon radical;
X is a halogen;
m and n each represent any number such that $0 \leq m < 2$ and $0 \leq n < 2$, and p represents a number such that $1 < p < 1.3$, the sum of m, n and p equalling 3.

7. The composition according to claim 6, wherein in the formula (I), R$^1$ and R$^2$ are selected from alkyl, alkoxy and aryloxy radicals, X is chlorine, m represents a number such $1 \leq m \leq 1.95$ and p represents a number such that $1 < p \leq 1.15$.

8. The composition according to claim 1, wherein the organoaluminium halide (A) is an alkylaluminium chloride possessing an atomic ratio chlorine/aluminium such that $1.01 \leq (Cl)/(Al) \leq 1.08$.

9. The composition according to claim 8, wherein the alkylaluminium chloride is an ethylaluminium chloride.

10. The composition according to claim 1, wherein the organoaluminium halide comprises the products of the reaction of halogenated alkylaluminium compounds with hydroxyaromatic compounds in which the hydroxyl group is sterically hindered.

11. The composition according to claim 1, wherein the mole ratio halide (A)/compound (ED) is between 35 and 150.

12. The composition according to claim 11, wherein the mole ratio halide (A)/compound (ED) is greater than 50 without exceeding 90.

13. The composition according to claim 1, wherein the electron-donating organic compound (ED) is a liquid aromatic carboxylic acid ester.

14. The composition according to claim 1, wherein the organoaluminium halide (A) is an alkylaluminium chloride possessing an atomic ratio (Cl)/(Al) of between 1.01 and 1.06 and in that the compound (ED) is ethyl benzoate employed in a mole ratio halide (A)/compound (ED) of between 52 and 75.

15. The composition according to claim 1, wherein the compound (ED) is brought into contact with the halide (A) preformed by prior mixing of organoaluminium compounds having halogen contents and in proportions suitable for conferring on the halide (A) an atomic ratio (X)/(Al) of greater than 1 and less than 1.3.

16. The composition according to claim 1, wherein the compound (ED) is introduced into the halide (A) maintained in the liquid state.

17. The composition according to claim 1, wherein it takes liquid form.

18. A catalytic composition for the polymerisation of alpha-olefins, comprising:
(a) a solid containing a titanium halide,
(b) a cocatalytic composition according to claim 1.

19. The composition according to claim 18, wherein the solid (a) is a solid based on titanium trichloride complexed with an electron-donating compound.

20. The composition according to claim 19, wherein the solid (a) corresponds to the formula:

in which
R is an alkyl radical comprising from 2 to 6 carbon atoms;
x is any number greater than 0.20;
y is any number greater than 0.009; and
C is the complexing agent.

21. The catalytic composition according to claim 19, wherein the solid (a) has been subjected to an activation treatment by means of a product of the reaction of an organoaluminium compound with a hydroxyaromatic compound in which the hydroxyl group is sterically hindered.

* * * * *